United States Patent
Ogaki et al.

(10) Patent No.: US 8,671,916 B2
(45) Date of Patent: Mar. 18, 2014

(54) FUEL TANK AND FUEL VAPOR TREATMENT DEVICE EQUIPPED WITH THE FUEL TANK

(75) Inventors: Yoshinori Ogaki, Toyota (JP); Yoshihide Ogawa, Anjo (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 219 days.

(21) Appl. No.: 13/021,936

(22) Filed: Feb. 7, 2011

(65) Prior Publication Data

US 2011/0192382 A1 Aug. 11, 2011

(30) Foreign Application Priority Data

Feb. 5, 2010 (JP) ................................. 2010-024171

(51) Int. Cl.
*F02M 33/02* (2006.01)

(52) U.S. Cl.
USPC ............................. 123/518; 123/516; 220/562

(58) Field of Classification Search
USPC .................. 123/518, 195 C, 198 E, 468, 509, 123/516–520, 522, 523; 220/86.1, 86.2, 220/216–220, 562–564, 746; 261/72.1
See application file for complete search history.

(56) References Cited

U.S. PATENT DOCUMENTS

| 203,180 | A | * | 4/1878 | Miller | 220/216 |
|---|---|---|---|---|---|
| 1,358,498 | A | * | 11/1920 | Ball | 261/49 |
| 1,409,420 | A | * | 3/1922 | Speed | 261/73 |
| 1,419,035 | A | * | 6/1922 | Flannery et al. | 261/41.1 |
| 1,495,247 | A | * | 5/1924 | Chandler | 261/72.1 |
| 1,586,684 | A | * | 6/1926 | Mock | 261/72.1 |
| 1,597,022 | A | * | 8/1926 | Drayton | 261/72.1 |
| 1,654,622 | A | * | 1/1928 | Wheeler | 261/133 |
| 1,702,265 | A | * | 2/1929 | Loughead | 417/132 |
| 1,774,580 | A | * | 9/1930 | Wich | 270/52.23 |
| 1,778,190 | A | * | 10/1930 | Holloway | 123/545 |
| 1,973,713 | A | * | 9/1934 | Justheim et al. | 261/72.1 |
| 2,621,031 | A | * | 12/1952 | Gonzalez et al. | 261/65 |
| 2,907,627 | A | * | 10/1959 | Cummings | 422/42 |
| 3,752,355 | A | * | 8/1973 | Weissenbach | 220/86.1 |
| 3,938,338 | A | * | 2/1976 | Cullen | 405/21 |
| 3,949,720 | A | * | 4/1976 | Zipprich et al. | 123/518 |
| 4,173,958 | A | * | 11/1979 | Kato et al. | 123/514 |
| 4,764,391 | A | * | 8/1988 | Wasserman et al. | 426/433 |
| 4,856,483 | A | * | 8/1989 | Beavis et al. | 123/516 |
| 4,907,719 | A | * | 3/1990 | Spotholz et al. | 222/1 |
| 5,056,493 | A | * | 10/1991 | Holzer | 123/518 |
| 5,115,784 | A | * | 5/1992 | Mito et al. | 123/516 |
| 5,460,135 | A | * | 10/1995 | Ohashi et al. | 123/518 |
| 5,746,185 | A | * | 5/1998 | Kidokoro et al. | 123/516 |

(Continued)

FOREIGN PATENT DOCUMENTS

| GB | 1224310 A | * | 3/1971 |
|---|---|---|---|
| JP | 59-109928 U | | 7/1984 |

(Continued)

*Primary Examiner* — Stephen K Cronin
*Assistant Examiner* — John Zaleskas
(74) *Attorney, Agent, or Firm* — Gifford, Krass, Sprinkle, Anderson & Citkowski, P.C.

(57) ABSTRACT

A fuel tank that stores a liquid fuel is equipped with a float member floating on the fuel stored in the fuel tank. In this fuel tank, the float member is so formed as to cover a liquid surface of the liquid fuel.

6 Claims, 4 Drawing Sheets

(56) References Cited

U.S. PATENT DOCUMENTS

| | | | |
|---|---|---|---|
| 5,746,186 A * | 5/1998 | Kidokoro | 123/516 |
| 5,868,120 A * | 2/1999 | Van Wetten et al. | 123/518 |
| 5,887,616 A * | 3/1999 | Ikeda et al. | 137/558 |
| 5,979,481 A * | 11/1999 | Ayresman | 137/14 |
| 6,260,544 B1 * | 7/2001 | Spry et al. | 123/516 |
| 6,382,453 B1 * | 5/2002 | Miura et al. | 220/562 |
| 6,389,893 B1 * | 5/2002 | Kobayashi | 73/305 |
| 7,017,786 B2 * | 3/2006 | Ho | 223/73 |
| 2003/0172912 A1 * | 9/2003 | Kanai et al. | 123/520 |
| 2003/0196482 A1 * | 10/2003 | Kanai et al. | 73/118.1 |
| 2004/0134561 A1 * | 7/2004 | Ichinohe | 141/59 |
| 2004/0187956 A1 * | 9/2004 | Dennis | 141/59 |
| 2005/0005696 A1 * | 1/2005 | Hale et al. | 73/290 V |
| 2006/0032663 A1 * | 2/2006 | Hosoya | 174/151 |
| 2006/0086343 A1 * | 4/2006 | Suzuki | 123/520 |
| 2006/0162433 A1 * | 7/2006 | Matsubara et al. | 73/118.1 |
| 2007/0006852 A1 * | 1/2007 | Schondorf et al. | 123/516 |
| 2007/0272692 A1 * | 11/2007 | Hiner | 220/219 |
| 2009/0206081 A1 * | 8/2009 | Snyder et al. | 220/217 |
| 2009/0266147 A1 * | 10/2009 | Maegawa | 73/40.7 |

FOREIGN PATENT DOCUMENTS

| | | | |
|---|---|---|---|
| JP | 63-053822 U | | 4/1988 |
| JP | 02-078422 U | | 6/1990 |
| JP | 2004308483 A | * | 11/2004 |
| JP | 2004308483 A | | 11/2004 |

* cited by examiner

FUEL TANK AND FUEL VAPOR TREATMENT DEVICE EQUIPPED WITH THE FUEL TANK

CROSS REFERENCE TO RELATED APPLICATION

This application claims priority to Japanese Patent Application No. 2010-024171 filed on Feb. 5, 2010, which is incorporated herein by reference in its entirety including the specification, drawings, and abstract.

BACKGROUND OF THE INVENTION

1. Field of the Invention

The invention relates to a fuel tank that stores a liquid fuel, and an fuel vapor treatment device equipped with the fuel tank.

2. Description of the Related Art

In a fuel tank that stores liquid fuel, fuel evaporates from a liquid surface of the fuel stored in the fuel tank, and fuel vapor is generated in the fuel tank. Japanese Patent Application Publication No. 2004-308483 (JP-A-2004-308483) describes a fuel vapor treatment device that introduces fuel vapor generated in a fuel tank into an intake passage of an internal combustion engine so that the fuel vapor is burned during the operation of the engine.

In this fuel vapor treatment device, fuel vapors generated in the fuel tank are introduced into a canister and temporarily adsorbed by an adsorbent provided in the canister. Then, during the operation of the engine, the air in the canister is drawn to the intake passage by the negative pressure in the intake passage, and purge is carried out to introduce the air into the canister from an air inlet passage. Due to the purge, the fuel adsorbed by the adsorbent is purged and introduced into the intake passage together with the air. The fuel purged from the adsorbent is then burned in the internal combustion engine.

That is, according to the above-described fuel vapor treatment device, fuel vapors generated in the fuel tank may be burned in the engine instead of being discharged to the atmosphere. In the meantime, in an fuel vapor treatment device mounted on a vehicle having an idling stop function of automatically stopping and restarting the operation of an internal combustion engine and hence designed to stop the internal combustion engine quite often, such as a hybrid vehicle or the like, the purge control is not executed very often. Thus, the amount of the fuel adsorbed by the adsorbent is unlikely to decrease, and the adsorbent is likely to be saturated. If the adsorbent is saturated, the adsorbent cannot adsorb any more fuel vapor. As a result, fuel vapor is discharged from the canister directly to the atmosphere through the air inlet passage.

Further, if the ambient temperature of outside air or fuel is high and fuel actively vaporizes in the fuel tank, even if a purge control is executed, newly generated fuel vapor is soon adsorbed by the adsorbent, and the adsorbent is therefore likely to become saturated. Thus, under a circumstance where fuel actively vaporizes, fuel vapor may be discharged directly to the atmosphere through the canister even if the fuel vapor treatment device is not mounted on a vehicle having the idling stop function.

Thus, in the fuel vapor treatment device described in Japanese Patent Application Publication No. 2004-308483 (JP-A-2004-308483), to restrain fuel vapor from being directly discharged to the atmosphere through the canister, a passage connecting the canister to the fuel tank is closed to seal the fuel tank when the engine is stopped, namely, during the cessation of purge.

If this configuration is adopted, fuel vapors are not introduced into the canister. Therefore, saturation of the adsorbent may be restrained, and the discharge of fuel vapor can be restrained from being discharged to the atmosphere through the canister.

However, fuel vapor cannot escape if the fuel tank is sealed, and therefore, the pressure in the fuel tank rises as more fuel is vaporized. Thus, if the fuel tank is sealed as described above, the fuel tank must have sufficient strength to withstand the rise in pressure. However, if the thickness of the fuel tank is increased to ensure sufficient strength, the weight and manufacturing cost of the fuel tank are increased.

Instead of the configuration in which the fuel tank is sealed as described above, it is also possible to adopt a configuration in which a canister equipped with a large-capacity adsorbent is provided to restrain the adsorbent from being saturated. However, if such a configuration is adopted, the size of the canister increases which may increase the size of the fuel vapor treatment device.

Thus, in order to effectively restrain fuel vapor from being discharged to the atmosphere from the canister without increasing the size of the canister, the weight of the fuel tank, and the like, it is desirable to suppress the generation itself of fuel vapor in the fuel tank.

SUMMARY OF THE INVENTION

The invention provides a fuel tank that suppresses the vaporization of fuel, and an fuel vapor treatment device equipped with the fuel tank.

A first aspect of the invention relates to a fuel tank that stores a liquid fuel. This fuel tank is equipped with a float member floating on the fuel stored in the fuel tank. In this fuel tank, the float member is so formed as to cover a liquid surface of the liquid fuel.

The fuel stored in the fuel tank vaporizes from that region of the liquid surface where fuel and air are in contact with each other. Thus, as the area of the liquid surface in contact with air increases, the likelihood of fuel vaporization increases and the amount of fuel vapors generated in the fuel tank increases.

In contrast, according to the aforementioned fuel tank, the float member floats on the stored fuel, and part of the float member is exposed to air from the liquid surface of the fuel. As a result, the area of the liquid surface where fuel and air are in contact with each other decreases by an area corresponding to the exposed region of the float member. Thus, the area of the liquid surface where fuel and air are in contact with each other can be reduced in comparison with a case where the float member is not provided. As a result, the generation of fuel vapors can be suppressed.

Further, since the float member floats on the fuel, part of the float member is exposed to air from the liquid surface of the fuel even when the liquid level of the fuel in the fuel tank has become low through fuel consumption or even when the liquid level of the fuel has become high through fuel replenishment. That is, even when the liquid level of the fuel has changed, the area of the liquid surface where fuel and air are in contact with each other can be reduced continuously, and the generation of fuel vapors can be suppressed continuously.

It should be noted that it is desirable to minimize the area of the liquid surface where fuel and air are in contact with each other in order to suppress the generation of fuel vapors to the maximum possible extent. Thus, from the standpoint of suppressing the generation of fuel vapors, it is desirable to design the shape, material and the like of the float member such that the area of the liquid surface where fuel and air are in contact with each other can be made as small as possible.

A second aspect of the invention relates to an fuel vapor treatment device. The fuel vapor treatment device includes a fuel tank that stores a liquid fuel. The fuel tank contains a float member that floats on the fuel stored in the fuel tank. The float member is so formed as to cover the liquid surface of the liquid fuel. The fuel vapor treatment device further includes a canister that contains an adsorbent for adsorbing fuel vapor; an exhaust passage that connects the fuel tank with the canister; a purge passage that connects an intake passage of an internal combustion engine with the canister; and an air inlet passage that introduces air into the canister. The fuel vapor treatment device executes a purge control to draw air in the canister out to the intake passage using negative pressure in the intake passage and introduce ambient air into the canister through the air inlet passage to purge fuel adsorbed by the adsorbent, and introduces the purged fuel into the intake passage together with air to be burned in the internal combustion engine.

If the adsorbent is saturated with fuel vapor, no addition fuel vapor may be adsorbed by the adsorbent, and fuel vapor is discharged to the atmosphere from the canister through the air inlet passage. Alternatively, it is also possible to adopt a configuration in which a canister equipped with a large-capacity adsorbent is provided to restrain the adsorbent from being saturated. However, if such a configuration is adopted, a larger canister is needed, thereby increasing the size of the fuel vapor treatment device.

In this respect, the fuel vapor treatment device is equipped with the fuel tank capable of suppressing the generation of fuel vapors as described above. Thus, even when the canister equipped with the large-capacity adsorbent is not provided, the adsorbent can be restrained from being saturated. That is, according to the aforementioned fuel vapor treatment device, the adsorbent can be restrained from being saturated while suppressing an increase in the size of the canister and an increase in the size of the fuel vapor treatment device.

BRIEF DESCRIPTION OF THE DRAWINGS

The foregoing and further features and advantages of the invention will become apparent from the following description of an example embodiment of the invention with reference to the accompanying drawings, wherein like numerals are used to represent like elements and wherein.

DETAILED DESCRIPTION OF EMBODIMENT

One embodiment of the invention in which a fuel tank according to the invention and a fuel vapor treatment device equipped with the fuel tank are embodied as a fuel tank and a fuel vapor treatment device mounted on a vehicle will be described hereinafter with reference to FIGS. 1 to 3. It should be noted that FIG. 1 shows an overall configuration of a fuel vapor treatment device 200 according to this embodiment of the invention.

Figure 1:
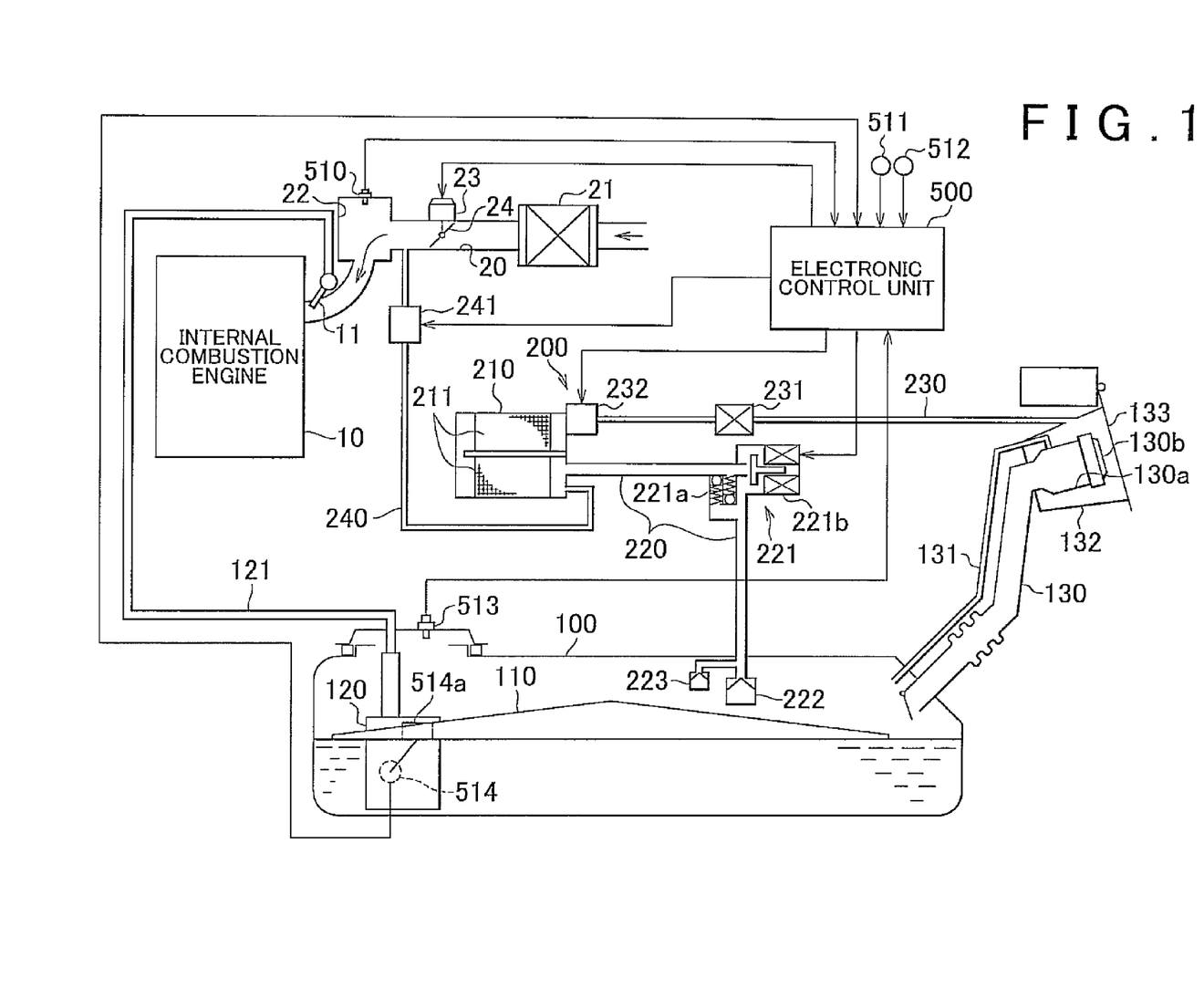
FIG. 1 is a schematic view showing an overall configuration of an fuel vapor treatment device according to one embodiment of the invention.

As shown in a lower part of FIG. 1, a fuel tank 100 is provided with a pump module 120 that draws fuel stored in the fuel tank 100. Further, a pressure sensor 513 that detects the pressure in the fuel tank 100 is provided in an upper portion of the fuel tank 100.

The pump module 120 is connected to a fuel injection valve 11 of an internal combustion engine 10 via a fuel supply pipe 121. Thus, the fuel drawn from the fuel tank 100 by the pump module 120 is supplied to the fuel injection valve 11 through the fuel supply pipe 121. It should be noted that the pump module 120 includes a fuel sender gauge 514 that detects the level of the fuel stored in the fuel tank 100 in accordance with the position of a float 514a floating on the fuel stored in the fuel tank 100.

Further, as shown on a right side of FIG. 1, the fuel tank 100 includes a fuel inlet pipe 130. A fuel feed port 130a located at the tip of the fuel inlet pipe 130 is accommodated in a fuel inlet box 132 provided on a body of a vehicle. It should be noted that the fuel inlet pipe 130 includes a circulation pipe 131 that connects the upper portion of the fuel tank 100 with an upstream portion of the fuel inlet pipe 130.

The fuel inlet box 132 is provided with a fuel lid 133. When fueling the vehicle, the fuel lid 133 is opened and a cap 130b fitted to the fuel feed port 130a is removed, thereby allowing the fuel to be injected into the fuel tank 100 through the fuel feed port 130a.

As shown in the upper part of FIG. 1, the fuel injection valve 11, which injects fuel supplied from the fuel tank 100, is provided in the intake passage 20 of the internal combustion engine 10. An inlet region of the intake passage 20 is provided with an air filter 21 that removes fine dust and the like contained in intake air.

The region of the intake passage 20 located upstream of a surge tank 22 is provided with a throttle valve 24 whose opening degree is adjusted by a motor 23 to regulate the amount of intake air ("intake air amount GA") drawn into the internal combustion engine 10. In addition, an airflow meter 510 that detects the intake air amount GA is provided in the surge tank 22.

As shown in a central region of FIG. 1, the fuel vapor treatment device 200 that treats fuel vapors generated in the fuel tank 100 is connected to the intake passage 20 of the internal combustion engine 10. The fuel vapor treatment device 200 includes a canister 210 that incorporates an adsorbent 211 for adsorbing fuel vapors. It should be noted that the adsorbent 211 is an activated carbon for adsorbing fuel.

The canister 210 is connected to the upper portion of the fuel tank 100 via an exhaust passage 220. As shown in FIG. 1, the exhaust passage 220 extends through a closure valve unit 221. The closure valve unit 221 includes a relief valve 221a that opens when the pressure differential between portion of the exhaust passage 220 upstream of the closure valve unit 221 and the portion of the exhaust passage 220 downstream of the closure valve unit 221 becomes very large, and a closure valve 221b that opens/closes a passage bypassing the relief valve 221a. It should be noted that the closure valve 221b is an electromagnetically driven valve that is actuated in accordance with a control command of an electronic control unit 500.

The closure valve unit 221 is provided in the exhaust passage 220. Therefore, when the closure valve 221b is closed, the exhaust passage 220 is closed by the relief valve 221a and the closure valve 221b.

As shown in the lower region of FIG. 1, an inlet region of the exhaust passage 220 in the fuel tank 100 is provided with an on-board refueling vapor recovery (ORVR) valve 222 and a rollover valve 223.

The ORVR valve 222 opens when the pressure in the fuel tank 100 rises due to a rise in the liquid level of the fuel resulting from fuel feeding. Thus, when the pressure in the fuel tank 100 rises due to a rise in the liquid level, fuel vapor in the fuel tank 100 are introduced into the canister 210 through the exhaust passage 220. Accordingly, the pressure increases in the fuel tank 100 due to a rise in the liquid level are avoided, and fuel vapors are restrained from being discharged to the atmosphere through the fuel inlet pipe 130 and the circulation pipe 131 during fueling.

In contrast, if the vehicle is greatly inclined, the rollover valve 223 closes to prevent the liquid fuel from leaking out of the fuel tank 100. The fuel vapor in the fuel tank 100 is introduced into the canister 210 through the exhaust passage 220 when at least one of the relief valve 221a and the closure valve 221b is open and at least one of the ORVR valve 222 and the rollover valve 223 is open. The fuel vapor introduced into the canister 210 is then adsorbed by the adsorbent 211.

Further, an air inlet passage 230 that communicates with the fuel inlet box 132 provided on the body of the vehicle is connected to the canister 210. The air inlet passage 230 extends through an air filter 231. It should be noted that the portion of the air inlet passage 230 located downstream of the air filter 231 is provided with a negative pressure pump unit 232 that switches between a state in which the air inlet passage 230 is closed and a state in which the air inlet passage 230 not closed so that the canister 210 is communicated with the fuel inlet box 132.

Furthermore, a purge passage 240 that communicates with the intake passage 20 is connected to the canister 210. As shown in FIG. 1, the purge passage 240 extends through a purge valve 241. The purge control valve 241 is opened or closed in accordance with a command from the electronic control unit 500.

The airflow meter 510, the pressure sensor 513, and the fuel sender gauge 514 are connected to the electronic control unit 500, which comprehensively controls the vehicle. In addition, various sensors such as an accelerator position sensor 511 that detects an amount of accelerator operation performed by a driver, a crank position sensor 512 that detects an engine rotational speed NE, and the like are connected to the electronic control unit 500.

Based on signals output from the various sensors, the electronic control unit 500 outputs control commands to respective components, thereby comprehensively controlling respective components of the vehicle including the fuel vapor treatment device 200. For example, during the operation of the engine, the electronic control unit 500 controls the motor 23 based on the engine rotational speed NE detected by the crank position sensor 512 and the accelerator operation amount detected by the accelerator position sensor 511, thereby driving the throttle valve 24 to regulate the intake air amount GA. Further, the electronic control unit 500 controls the open duration of the fuel injection valve 11 in accordance with the intake air amount GA to control the amount of fuel injection.

Furthermore, during the operation of the engine, the electronic control unit 500 controls the fuel vapor treatment device 200 to purge the fuel adsorbed by the adsorbent 211 of the canister 210, and executes a purge control to introduce the purged fuel into the intake passage 20 with air.

In particular, during the operation of the engine, the electronic control unit 500 opens the purge control valve 241 so that the air in the canister 210 is drawn to the intake passage 20 through the purge passage 240 by the negative pressure in the intake passage 20.

Then, at this moment, the electronic control unit 500 changes over the negative pressure pump unit 232 to a state in which the canister 210 and the fuel inlet box 132 communicate with each other with the air inlet passage 230 not closed, thereby introducing air into the canister 210 through the air inlet passage 230. Thus, the fuel adsorbed by the adsorbent 211 is purged, and the purged fuel is introduced into the intake passage 20 through the purge passage 240 with air.

Because the purge is appropriately carried out during the operation of the engine, the fuel adsorbed by the adsorbent 211 is purged from the adsorbent 211. Therefore, saturation of the adsorbent 211 may be restrained. Further, the purged fuel is introduced into the intake passage 20 together with air and burned in the internal combustion engine 10. Therefore, the fuel vapors generated in the fuel tank 100 may be burned in the engine without being discharged to the atmosphere.

It should be noted that the fuel vapor treatment device 200 according to this embodiment of the invention closes the closure valve 221b to close the exhaust passage 220 when the engine is stopped, except when fueling. Thus, the fuel tank 100 is basically sealed when the engine is stopped. No fuel vapors are introduced into the canister 210 unless the pressure in the fuel tank 100 exceeds the pressure for opening the relief valve 221a.

Thus, the adsorption of fuel vapor by the adsorbent 211 to the point of saturation when the engine is stopped may be avoided, in particular, during the time when the purge control is not executed. Further, the fuel tank 100 is thus sealed during when the engine is stopped. Thus, the discharge of fuel vapor that cannot be adsorbed by the adsorbent 211 to the atmosphere, directly through the canister, may be restrained.

However, while the fuel tank 100 is sealed, the fuel vapor generated within the fuel tank 100 cannot escape. Therefore, the pressure in the fuel tank 100 rises as more fuel is vaporized.

If the cap 130b is removed to open the fuel feed port 130a and the pressure in the fuel tank 100 is higher than the atmospheric pressure, the fuel vapor in the fuel tank 100 may be discharged to the atmosphere through the fuel inlet pipe 130. Thus, in the fuel vapor treatment device 200 according to this embodiment of the invention, the closure valve 221b is first opened during fueling to introduce the fuel vapors in the fuel tank 100 into the canister 210 through the exhaust passage 220, thereby reducing the pressure in the fuel tank 100. Then, after the pressure in the fuel tank detected by the pressure sensor 513 has decreased sufficiently, the fuel lid 133 is unlocked.

When the fuel lid 133 is thus unlocked, the discharge of the fuel vapor in the fuel tank 100 to the atmosphere through the fuel inlet pipe 130 when the fueling port 130a is opened may be restrained.

In the meantime, as described above, when the fuel tank 100 is sealed while the engine is stopped, the fuel vapors cannot escape therefrom. Therefore, the pressure in the fuel tank 100 rises as the fuel vaporizes. Thus, the fuel tank 100 needs to be sufficiently strong to withstand the increase in pressure. However, if the thickness of the fuel tank 100 is increased to ensure sufficient strength, the weight of the fuel tank 100 increases, thereby increasing the manufacturing cost.

It should be noted that it is also possible to adopt a configuration in which the canister 210 is equipped with a large-capacity adsorbent 211 to restrain the adsorbent 211 from being saturated, instead of a configuration in which the fuel tank 100 is sealed up as is the case with the fuel vapor treatment device 200 according to this embodiment of the invention. However, if such a configuration is adopted, the size of the canister 210 is increased, which results in an increase in the size of the fuel vapor treatment device 200.

Thus, in order to effectively restrain fuel vapors from being discharged to the atmosphere through the canister 210 without increasing the size of the canister 210, or the weight of the fuel tank 100, it is desirable to suppress the generation of fuel vapors in the fuel tank 100.

Thus, in the fuel vapor treatment device 200 according to this embodiment of the invention, a float board 110 floating on fuel is provided in the fuel tank 100 as shown in FIG. 1. The structure of the float board 110 provided in the fuel tank 100 will be described below in detail with reference to FIGS. 2 and 3. FIG. 2 is a top view of the float board 110 in the fuel tank 100, and that FIG. 3 is a cross-sectional view of the float board 110 taken along the line A-A of FIG. 2.

Figure 2:
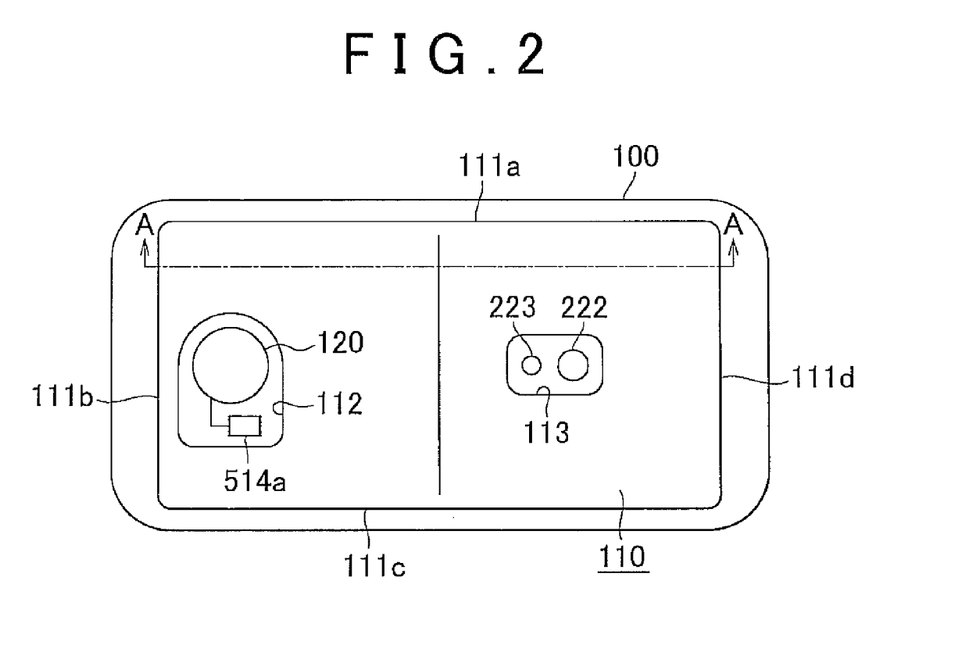
FIG. 2 is a top view showing the shape of a float board provided in the fuel tank of the fuel vapor treatment device according to the embodiment of the invention.

As shown in FIG. 2, the float board 110 is formed in the shape of a rectangular plate so as to substantially entirely cover the liquid surface of the fuel stored in the fuel tank 100. It should be noted that the float board 110 needs to move up and down in the fuel tank 100 in accordance with changes in the liquid level of the fuel stored in the fuel tank 100. Therefore, as shown in FIG. 2, the float board 110 is configured such that each outer peripheral end 111a, 111b, 111c and 111d thereof remains out of contact with the inner wall of the fuel tank 100.

Further, a through-hole 112 may be formed in the float board 110 extending in a vertical direction to prevent interference between the pump module 120 and the float 514a with the float board 110. Thus, in the fuel tank 100 according to this embodiment of the invention, the float board 110 floats on the fuel stored in the fuel tank 100 with the pump module 120 and the float 514a inserted in the through-hole 112 as shown in FIG. 2.

Furthermore, a through-hole 13 is formed in the float board 110 extending in the vertical direction to prevent the float board 110 from interfering with the ORVR valve 222 and the rollover valve 223, even if the liquid level of fuel is high.

Figure 3:
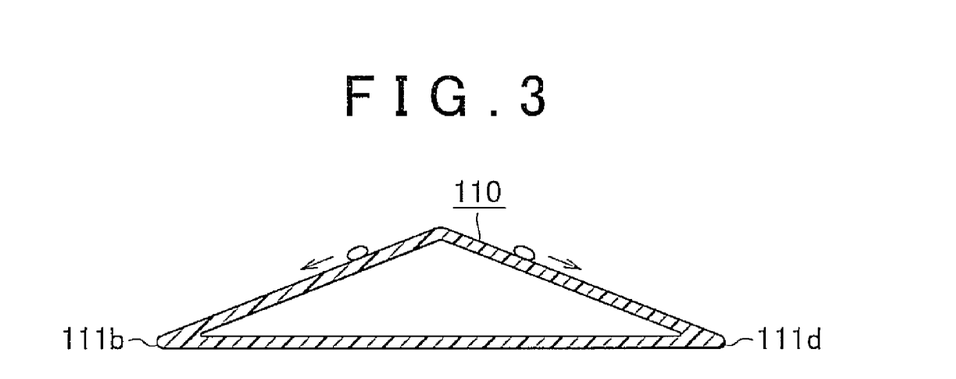
FIG. 3 is a cross-sectional view of the float board taken along a line A-A of FIG. 2.

The float board 110 is formed of a resin resistant to corrosion by fuel, for example, high-density polyethylene or the like, and has a hollow interior as shown in FIG. 3. Thus, the float board 110 floats on the fuel stored in the fuel tank 100.

Further, the top face of the float board 110 is inclined to gradually decrease in height from the region of the float board 110 located at the center in FIG. 3 to the outer peripheral ends 111b and 111d located at the left and right in FIG. 3 respectively. Thus, the float board 110 is formed in the shape of a mountain with its central region having a maximum height as shown in FIG. 3.

The top face of the float board 110 is inclined to gradually decrease in height toward the outer peripheral ends 111b and 111d as described above. Therefore, if fuel adheres to the top face of the float board 110 due to fuel feeding, the sway of fuel resulting from the sway of the vehicle, or the like, the fuel flows down because along the inclined top face as indicated by arrows in FIG. 3.

According to the embodiment of the invention described above, the following effects are obtained.

(1) The fuel stored in the fuel tank 100 vaporizes from the liquid surface of the fuel that is exposed to air. Thus, as the area of the liquid surface exposed to air increases, the likelihood of fuel vaporization increases, and the amount of the fuel vapor generated in the fuel tank 100 increases.

On the other hand, in the fuel tank 100, the float board 110 floats on the stored fuel, and the top face of the float board 110 is exposed to air from the liquid surface of the fuel. Thus, the area of the liquid surface exposed to air is smaller when the float board 110 is not provided, by the area of the float board 110. Accordingly, the generation of fuel vapor is suppressed in comparison with the case where the float board 110 is not provided.

(2) The float board 110 floats on fuel. Therefore, even when the level of the fuel in the fuel tank 100 has become low due to fuel consumption or even when the liquid level of the fuel has become high due to fuel replenishment, part of the float board 110 is exposed to air from the liquid surface of the fuel.

That is, according to the fuel tank 100 of the foregoing embodiment of the invention, even if the liquid level of the fuel changes, the area of the liquid surface of fuel that is exposed to air may be reduced, and the generation of fuel vapors may be suppressed.

(3) Because the top face of the float board 110 is inclined to gradually decrease in height toward the outer peripheral ends 111b and 111d, fuel that has adhered to the top face of the float board 110 swiftly flows downward along the inclined face. Accordingly, the accumulation of fuel on the top face of the float board 110 may be restrained, and vaporization of fuel on the top face of the float board 110 may thereby be restrained.

(4) When a large amount of fuel adheres to the adsorbent 211 to saturate the adsorbent 211, no more fuel can be adsorbed by the adsorbent 211. As a result, fuel vapor is discharged from the air inlet passage 230 directly through the canister 210.

However, it is also possible to adopt a configuration in which a high-capacity adsorbent 211 is provided in the canister 210 to restrain the adsorbent 211 from being saturated. However, if such a configuration is adopted, the size of the canister 210 increases which entails an increase in the size of the fuel vapor treatment device 200.

In this respect, the fuel vapor treatment device 200 according to the foregoing embodiment of the invention is equipped with the fuel tank 100 that suppresses the generation of fuel vapors as described above. Thus, even if a high-capacity adsorbent 211 is not provided in the canister, saturation of the adsorbent 211 may still be restrained. That is, according to the fuel vapor treatment device 200 of the foregoing embodiment of the invention, saturation of the adsorbent 211 may be restrained without increasing the size of the canister 210 or increasing the size of the fuel vapor treatment device 200.

(5) Further, in executing the purge control, it is necessary to generate negative pressure in the region of the intake passage 20 located downstream of the throttle valve 24 by reducing the opening degree of the throttle valve 24 and increasing the resistance to the suction of air in the intake passage 20. That is, in executing the purge control, the internal combustion engine 10 operates under a higher load. Thus, when the purge control is executed, the fuel consumption increases correspondingly.

In contrast, in the fuel tank 100, the generation of fuel vapor is suppressed. Therefore, the adsorbent 211 is unlikely to be saturated. Accordingly, the frequency with which the purge control is executed may be reduced, and increases in fuel consumption when the purge control is executed may be restrained.

(6) if the configuration in which the closure valve 221b is closed to seal the fuel tank 100 when the engine is stopped, as in the case of the fuel vapor treatment device 200, is adopted, no fuel vapor is introduced into the canister 210 while the fuel tank 100 is sealed. Thus, saturation of the adsorbent 211 may be restrained, and the discharge of fuel vapor to the atmosphere through the canister 210 may be restrained.

However, as described above, fuel vapor cannot escape from the fuel tank 100 when the fuel tank 100 is sealed. Therefore, the pressure in the fuel tank 100 increases as fuel vaporizes. Thus, when the configuration in which the fuel tank 100 is thus sealed is adopted in the fuel vapor treatment device 200 equipped with the fuel tank 100 that is not provided with the float board 110, the thickness of the fuel tank 100 walls need to be increased to ensure such sufficient strength to withstand an increase in pressure.

In contrast, if a configuration in which the fuel tank 100 is sealed while the engine is stopped is adopted in the fuel vapor treatment device 200 equipped with the fuel tank 100 provided with the float board 110 and can suppress the generation of fuel vapors as in the case of the foregoing embodiment of the invention, the generation of fuel vapor leads to only a small increase in pressure. Therefore, sufficient strength to withstand the increase in pressure may be easily ensured.

That is, according to the fuel vapor treatment device 200, the configuration in which the fuel tank 100 is sealed while suppressing an increase in the weight of the fuel tank 100 for ensuring strength and an increase in manufacturing cost can be adopted. As a result, saturation of the adsorbent 211 may be more suitably restrained, and the discharge of fuel vapors to the atmosphere through the canister 210 may also be more suitably restrained.

It should be noted that the foregoing embodiment of the invention may also be implemented in the following modes as appropriate modifications thereof. Although the top face of the float board 110 is inclined to gradually decrease in height toward the outer peripheral ends 111b and 111d in the foregoing embodiment of the invention, the top face of the float board 110 may instead be inclined to gradually decrease in height toward at least one of the outer peripheral ends 111a, 111b, 111c and 111d, so that fuel flows downward along the inclined top face as in the case of the fuel tank 100.

Figure 4:
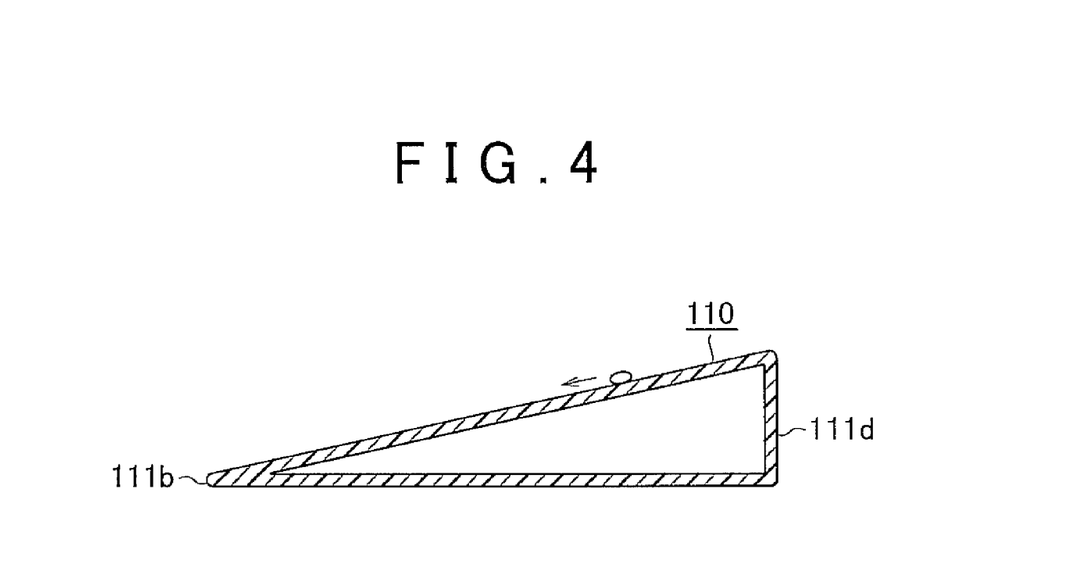
FIG. 4 is a cross-sectional view of a modified example the float board.

Thus, for example, it is also possible to adopt a configuration in which the top face of the float board 110 is inclined to gradually decrease in height toward the left outer peripheral end 111b as shown in FIG. 4. If this configuration is adopted, fuel that has adhered to the float board 110 flows down because of its own weight toward the outer peripheral end 111b as indicated by an arrow in FIG. 4. Thus, an effect similar to that described above in (3) may be achieved.

Figure 5:
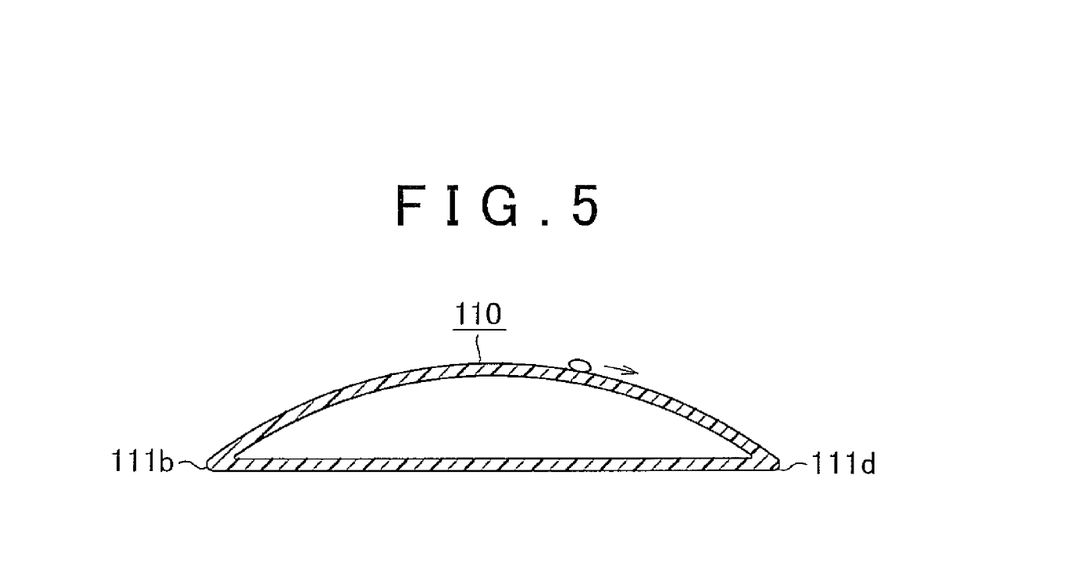
FIG. 5 is a cross-sectional view of another modified example of the float board.

Further, although the configuration in which the top face of the float board 110 is linearly formed is shown in the foregoing embodiment of the invention, the top face of the float board 110 may be inclined in a curved manner as shown in FIG. 5. If this configuration is adopted as well, fuel that has adhered to the float board 110 flows down because of its own weight toward the outer peripheral ends 111b and 111d as indicated by an arrow in FIG. 5. Thus, an effect similar to that described above in (3) is achieved.

In the foregoing embodiment of the invention, a configuration in which the float board 110 covers almost the entire the liquid surface of the fuel stored in the fuel tank 100 is illustrated. However, if the area of the liquid surface where fuel exposed to air can be reduced even if only slightly, the generation of fuel vapors can be suppressed correspondingly. Therefore, the size of the float board 110 may be changed to suit the needs of the application.

Figure 6:
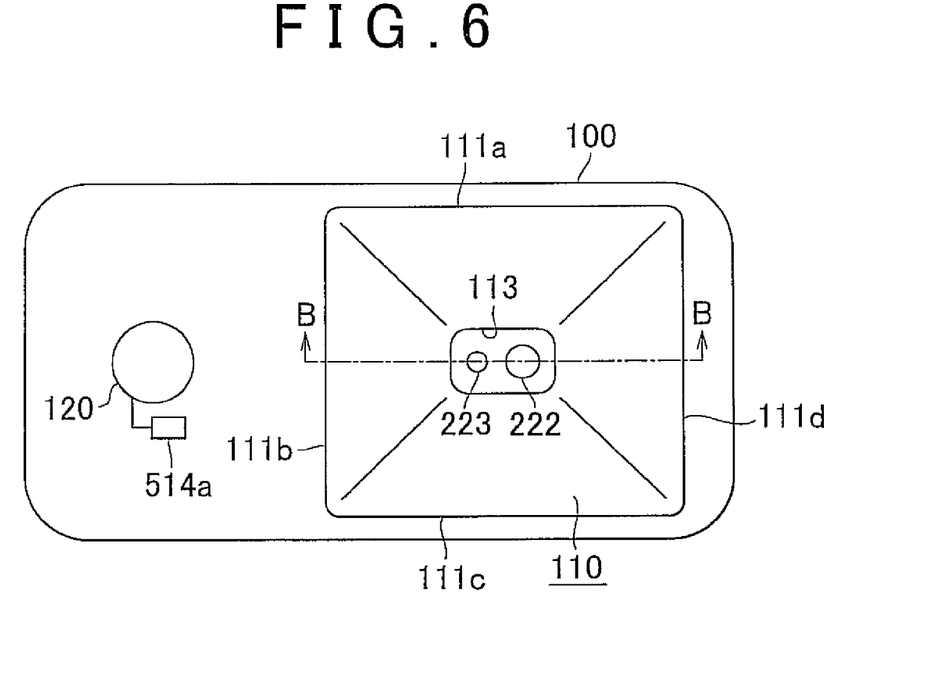
FIG. 6 is a top view showing the shape of still another modified example of the float board.

For example, as shown in FIG. 6, the size of the float board 110 may be so set as to cover only the region to the right of the pump module 120. However, to more effectively suppress the generation of fuel vapor, it is desirable to maximize the size of the float board 110 such that most of the liquid surface is not exposed to air, thereby minimizing the area of the liquid surface where air is in contact with fuel.

Figure 7:
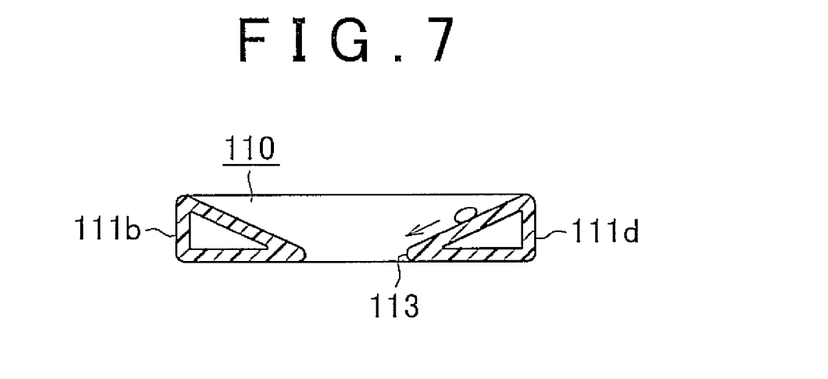
FIG. 7 is a cross-sectional view of the float board shown in FIG. 6 taken along a line B-B of FIG. 6.

Further, as shown in FIG. 7, it is also possible to adopt a configuration in which the top face of the float board 110 is so inclined as to gradually decrease in height toward the through-hole 113. If the described configuration is adopted, the fuel that has adhered to the float board 110 flows down because of its own weight toward the through-hole 113 as indicated by an arrow in FIG. 7. Thus, as with the fuel tank 100 according to the above embodiment of the invention, that accumulation of fuel on the top face of the float board 110 may be restrained, and vaporization of fuel from the top face of the float board 110 may thereby be restrained. FIG. 7 is a cross-sectional view of the float board 110 taken along a line B-B of FIG. 6.

Moreover, the top face of the float board may be inclined in any manner as long as the fuel that has adhered to the top face of the float board 110 flows downward due to gravity and into the liquid fuel stored in the fuel tank 100.

Further, in the foregoing embodiment of the invention, the float board 110 has a rectangular bottom face. However, the invention is not intended to limit the shape of the bottom face of the float board 110 to a rectangle. For example, the conical float board 110 having a circular bottom face may be floated in the fuel tank 100.

Further, if the top face is not inclined, an effect similar to that described above in (1) may be achieved as long as the fuel tank 100 includes the float board 110. Therefore, there is no absolute need to incline the top face of the float board 110. However, to restrain the generation of fuel vapors due to exposure of fuel to air, it is preferable to reduce the accumulation of fuel on the top face of the float board 110.

Further, in the above embodiment of the invention, the configuration in which the plate-like float board 110 is provided as the float member floating on fuel is illustrated. However, the shape of the float member is not limited to the plate-like shape of the float board 110 according to the foregoing embodiment of the invention.

That is, as long as the float member floats on fuel and is partially exposed to air from the liquid surface, the area of the liquid surface where fuel contacts the air may be reduced, regardless of the shape of the float member. Thus, the shape of the float member may be appropriately changed.

The configuration in which the closure valve 221b closes the exhaust passage 220 when the engine is stopped to hermetically seal the fuel tank 100 is illustrated. However, the application of the invention is not restricted to the fuel vapor treatment device 200 equipped with the closure valve 221b.

At least if an adopted configuration that includes the fuel tank 100 equipped with a float member, the generation of fuel vapor in the fuel tank 100 is suppressed. Thus, even if the configuration in which the closure valve 221b is provided to close the exhaust passage 220 when the engine is stopped to seal the fuel tank 100 is not adopted, saturation of the adsorbent 211 may be restrained in comparison with the conventional fuel vapor treatment device equipped with the fuel tank 100 that does not include the float member.

It should be noted that from the standpoint of more reliably restraining saturation of the adsorbent 211 or more reliably restraining the discharge of fuel vapor through the air inlet passage 230, it is desirable to adopt a configuration in which the closure valve 221b is provided to seal the fuel tank 100 when the engine is stopped, as in the case of the above embodiment of the invention.

The configuration of the fuel tank 100 presented in the above embodiment of the invention is merely an example of the embodiment of the invention. If at least the float member floating on the stored fuel is provided, the generation of fuel vapors is suppressed by reducing the area of the liquid surface in the fuel tank 100 exposed to air. That is, as long as there is a configuration provided with a float member floating on fuel, the configuration of the other regions of the fuel tank 100 and the configuration of the other regions of the fuel vapor treatment device 200 may be appropriately changed.

It is desirable to mount the fuel tank 100 according to the invention and the fuel vapor treatment device 200 equipped with this fuel tank 100 on a vehicle with an idling stop function, such as a hybrid vehicle or the like.

In a vehicle with the idling stop function, the internal combustion engine 10 is automatically stopped when, for example, the vehicle stops at a red light at an intersection. Thus, in a vehicle with the idling stop function, the internal combustion engine 10 is stopped quite often, and the frequency with which the purge control is executed is low. Thus, in a vehicle with the idling stop function, the adsorbent 211 of the fuel vapor treatment device 200 is more likely to be saturated.

In contrast, with the fuel tank 100 according to the invention, the generation of fuel vapors may be suppressed as described above. Therefore, even if the vehicle with the idling stop function, in which the frequency of executing the purge control is likely to be low, saturation of the adsorbent 211 is suitably restrained.

What is claimed is:

1. A fuel tank that stores a liquid fuel to be supplied to a fuel injector, said fuel tank comprising: a float member that floats on the fuel stored in the fuel tank so as to cover a surface of the liquid fuel, the float member is formed with a through-hole that extends vertically through the float member, the top face surrounding the through-hole is inclined so as to gradually decrease in height toward the through-hole so that a fuel that has adhered to the top face of the float member flows downward along the top face of the float member and falls onto the surface of the liquid fuel; and a member provided in the fuel tank, the member is positioned along a vertical axis, the vertical axis positioned to align with the through-hole such that the member is positioned within the through-hole when the surface of the liquid fuel is equal to or greater than a predetermined level.

2. The fuel tank according to claim 1, wherein the member provided in the fuel tank is a valve.

3. A fuel vapor treatment device comprising:
a fuel tank having a float member that floats on a liquid fuel stored in the fuel tank so as to cover a surface of the liquid fuel, the float member is formed with a through-hole that extends vertically through the float member, the float member has a top face exposed to air, the top face is inclined so as to gradually decrease in height toward the through-hole so that a fuel that has adhered to the top face of the float member flows downward along the top face of the float member and falls onto the surface of the liquid fuel;

a member provided in the fuel tank, the member is positioned along a vertical axis, the vertical axis positioned to align with the through-hole such that the member is positioned within the through-hole when the surface of the liquid fuel is equal to or greater than a predetermined level;

a canister that includes an adsorbent for adsorbing fuel vapor of the liquid fuel;

an exhaust passage that connects the fuel tank with the canister;

a purge passage that connects an intake passage of an internal combustion engine with the canister; and an air inlet passage that introduces air into the canister, wherein the fuel vapor treatment device performs a purge control in which fuel vapor adsorbed on the fuel vapor adsorbent is purged by drawing air through the air inlet passage into the canister and out into the intake passage by negative pressure in the intake passage, so that the purged fuel vapor is burned in the internal combustion engine.

4. The fuel vapor treatment device according to claim 3, further comprising
a closure valve that closes the exhaust passage to seal the fuel tank when the internal combustion engine is stopped.

5. The fuel vapor treatment device according to claim 3, wherein the member provided in the fuel tank is a valve.

6. A fuel tank that stores a liquid fuel, comprising:
a float member that floats on the fuel stored in the fuel tank so as to cover a surface of the liquid fuel, the float member is formed with a through-hole that extends vertically through the float member, the float member has a top face exposed to air, the top face is inclined so as to gradually decrease in height toward the through-hole so that a fuel that has adhered to the top face of the float member flows downward along the top face of the float member and falls onto the surface of the liquid fuel; and a fuel gauge that detects a level of the liquid fuel stored in the fuel tank based on a level of a float gauge that floats on the surface of the liquid fuel, the float gauge is positioned within the through-hole.

\* \* \* \* \*